United States Patent
Fukunaga et al.

(10) Patent No.: US 9,573,619 B2
(45) Date of Patent: Feb. 21, 2017

(54) PHYSICAL QUANTITY DETECTING DEVICE AND ELECTRIC POWER STEERING APPARATUS USING SAME

(71) Applicant: NSK LTD., Shinagawa-ku, Tokyo (JP)

(72) Inventors: Masanao Fukunaga, Gunma (JP); Shuji Endo, Tokyo (JP); Yoshihiro Aosaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 21 days.

(21) Appl. No.: 14/431,821

(22) PCT Filed: Oct. 9, 2013

(86) PCT No.: PCT/JP2013/006025
§ 371 (c)(1),
(2) Date: Mar. 27, 2015

(87) PCT Pub. No.: WO2014/057671
PCT Pub. Date: Apr. 17, 2014

(65) Prior Publication Data
US 2015/0239494 A1    Aug. 27, 2015

(30) Foreign Application Priority Data

Oct. 10, 2012  (JP) ................................. 2012-224815
Sep. 30, 2013  (JP) ................................. 2013-204890

(51) Int. Cl.
*B62D 5/04*    (2006.01)
*G01L 5/22*    (2006.01)
(Continued)

(52) U.S. Cl.
CPC ............ *B62D 5/0463* (2013.01); *B62D 5/049* (2013.01); *G01L 5/221* (2013.01); *G08C 25/00* (2013.01);
(Continued)

(58) Field of Classification Search
CPC ....... B62D 5/0463; B62D 5/049; G01L 5/221; G08C 25/00; H04Q 2209/823; H04Q 2209/86; H04Q 9/00
(Continued)

(56) References Cited

U.S. PATENT DOCUMENTS 6,381,526 B1     4/2002  Higashi et al.
2009/0314573 A1  12/2009 Oniwa et al.
(Continued)

FOREIGN PATENT DOCUMENTS

DE    10 2011 017 223 A1   11/2011
EP        1 826 097 A1      8/2007
(Continued)

OTHER PUBLICATIONS

Japanese Office Action dated Jul. 28, 2015 with partial English-language translation (four (4) pages).
(Continued)

*Primary Examiner* — Khoi Tran
*Assistant Examiner* — Robert Nguyen
(74) *Attorney, Agent, or Firm* — Crowell & Moring LLP

(57) ABSTRACT

A physical quantity detecting device that can determine abnormality of a signal transmission system between a physical quantity detector and a controller and an electric power steering apparatus using the physical quantity detecting device are provided. The physical quantity detecting device includes a physical quantity detector configured to detect a physical quantity and to output a physical quantity detection signal and a controller configured to receive the physical quantity outputted from the physical quantity detector via a transmission line and to perform a control operation on the basis of the physical quantity. The physical quantity detector outputs a diagnostic signal for detecting abnormality of a transmission system between the controller and the
(Continued)

physical quantity detector and the controller includes an abnormality determining unit configured to determine abnormality of the transmission system on the basis of the diagnostic signal when receiving the diagnostic signal.

7 Claims, 10 Drawing Sheets

(51) Int. Cl.
   *G08C 25/00* (2006.01)
   *H04Q 9/00* (2006.01)
(52) U.S. Cl.
   CPC .......... *H04Q 9/00* (2013.01); *H04Q 2209/823* (2013.01); *H04Q 2209/86* (2013.01)
(58) Field of Classification Search
   USPC .......................................................... 701/43
   See application file for complete search history.

(56) References Cited

U.S. PATENT DOCUMENTS

| | | | | |
|---|---|---|---|---|
| 2011/0010584 | A1* | 1/2011 | Kochar | G06F 11/0724 |
| | | | | 714/32 |
| 2012/0006612 | A1 | 1/2012 | Wilson-Jones et al. | |
| 2012/0226397 | A1* | 9/2012 | Sopko | B60L 3/003 |
| | | | | 701/22 |
| 2014/0015691 | A1* | 1/2014 | Wohrle | G08C 25/00 |
| | | | | 340/870.21 |
| 2015/0097527 | A1* | 4/2015 | Dedona | B60L 11/1818 |
| | | | | 320/109 |

FOREIGN PATENT DOCUMENTS

| | | | |
|---|---|---|---|
| JP | 62-180500 A | | 8/1987 |
| JP | 62180500 A | * | 8/1987 |
| JP | 2000-076579 A | | 3/2000 |
| JP | 3791253 B2 | | 6/2006 |
| JP | 2010-188799 A | | 9/2010 |
| JP | 2010188799 A | * | 9/2010 |
| JP | 4572227 B2 | | 11/2010 |

OTHER PUBLICATIONS

Chinese Office Action issued in counterpart Chinese Application No. 201380023059.6 dated Dec. 28, 2015 with English-language translation (nine (9) pages).
International Search Report (PCT/ISA/210) dated Nov. 19, 2013, with English translation (Three (3) pages).
Japanese language Written Opinion dated Nov. 19, 2013 (Five (5) pages).
International Preliminary Report on Patentability (PCT/IB/338 & PCT/IB/373) dated Apr. 23, 2015, including English translation of Document C2 (Japanese-language Written Opinion (PCT/ISA/237)) previously filed on Mar. 27, 2015 (seven (7) pages.
European Search Report issued in European Application No. 13846141.3 dated May 18, 2016 (six pages).

* cited by examiner

PHYSICAL QUANTITY DETECTING DEVICE AND ELECTRIC POWER STEERING APPARATUS USING SAME

TECHNICAL FIELD

The present invention relates to a physical quantity detecting device having a physical quantity detector configured to detect physical quantities such as a torque and an angle and a controller configured to receive the detected physical quantity and an electric power steering apparatus using the physical quantity detecting device.

BACKGROUND ART

For example, in a conventional electric power steering apparatus, a steering torque detected by a torque sensor as a physical quantity detecting unit is supplied to a control device as a control unit, and a current flowing in an electric motor configured to transmit a steering assist force to a steering apparatus is controlled on the basis of the steering torque by the control device.

In such an electric power steering apparatus, abnormality of the torque sensor is detected since the current to be supplied to the electric motor is controlled on the basis of the steering torque detected by the torque sensor.

In order to detect abnormality of such a torque sensor, a magnetostrictive torque sensor including failure detecting means for detecting a failure on the basis of detection results of torque detecting means and an electric power steering apparatus including the magnetostrictive torque sensor have been proposed (for example, see PTL 1).

There has been proposed a torque detecting device including a torque sensor disposed in a rotating shaft and outputting a predetermined electrical signal corresponding to a torque applied to the rotating shaft, a sensor circuit outputting the predetermined electrical signal outputted from the torque sensor as a sensor circuit signal, and an output signal processing circuit processing the output of the sensor circuit and outputting the processed signal as a torque detection signal, wherein the signal processing circuit is provided in parallel with an abnormality state monitoring circuit that operates in response to the sensor circuit signal and that monitors occurrence of an abnormal operation in the signal output from the sensor circuit such that the abnormality state monitoring circuit outputs an abnormality occurrence signal of a high level or a low level to a power steering controller when the abnormality state monitoring circuit determines that a signal involved in the sensor circuit signal is in an oscillating state (for example, see PTL 2).

CITATION LIST

Patent Literature

PTL 1: Japanese Patent No. 4572227
PTL 2: Japanese Patent No. 3791253

SUMMARY OF INVENTION

Technical Problem

In the conventional examples described in PTL 1 and PTL 2, a failure is detected on the basis of the detection result of the torque detecting means or signal abnormality of the output sensor circuit is detected using the predetermined electrical signal outputted from the torque sensor as the sensor circuit signal.

However, in the above-mentioned conventional examples, abnormality of the torque calculated in the torque sensor or the torque detecting device is detected, there is an unsolved problem in that abnormality of a transmission line through which the torque detection signal of the torque sensor or the torque detecting device is supplied to the control device cannot be detected.

Therefore, the present invention is made in consideration of the unsolved problem of the above-mentioned conventional examples, and an object thereof is to provide a physical quantity detecting device that can detect abnormality of a signal transmission system between a physical quantity detector and a controller and an electric power steering apparatus using the physical quantity detecting device.

Solution to Problem

In order to achieve the above-mentioned object, a first aspect of a physical quantity detecting device according to the present invention includes a physical quantity detector configured to detect a physical quantity and to output a physical quantity detection signal; and a controller configured to receive the physical quantity outputted from the physical quantity detector via a transmission line and to perform a control operation on the basis of the physical quantity, wherein the physical quantity detector outputs a diagnostic signal for detecting abnormality of a transmission system between the controller and the physical quantity detector and the controller includes an abnormality determining unit configured to determine the abnormality of the transmission system on the basis of the diagnostic signal when receiving the diagnostic signal.

In a second aspect of the physical quantity detecting device according to the present invention, the physical quantity detector includes a signal switch configured to switch between the physical quantity detection signal and the diagnostic signal.

In a third aspect of the physical quantity detecting device according to the present invention, the physical quantity detector outputs the diagnostic signal for a predetermined period of time at a time of power-up.

In a fourth aspect of the physical quantity detecting device according to the present invention, the physical quantity detector outputs the diagnostic signal for a predetermined period of time at a fixed period of time.

In a fifth aspect of the physical quantity detecting device according to the present invention, the physical quantity detector outputs a signal distinguishable from the physical quantity detection signal as the diagnostic signal.

In a sixth aspect of the physical quantity detecting device according to the present invention, the controller is configured to output a diagnostic signal output request to the physical quantity detector, and the physical quantity detector outputs the diagnostic signal to the transmission line when receiving the diagnostic signal output request.

In a seventh aspect of the physical quantity detecting device according to the present invention, the physical quantity detector outputs a pulse-width modulated signal with a pulse width corresponding to the physical quantity as the physical quantity detection signal, and the diagnostic signal is set to have a duty ratio out of an effective range of the pulse-width modulated signal.

In an eighth aspect of the physical quantity detecting device according to the present invention, the physical quantity detector outputs the physical quantity detection signal to the controller via a noise filter, and the abnormality determining unit determines whether or not the noise filter is abnormal by detecting a change of at least one of a rise and a fall of the received diagnostic signal.

A first aspect of an electric power steering apparatus according to the present invention includes the physical quantity detecting device according to any one of the first to eighth aspects, wherein the physical quantity detecting device detects at least one physical quantity necessary for calculating a steering torque command value and outputs the physical quantity detection signal and the diagnostic signal, and wherein the controller calculates the steering torque command value on the basis of the physical quantity detection signal of the physical quantity detecting device, and controls an electric motor generating a steering assist force on the basis of the calculated steering torque command value, and the abnormality determining unit determines whether or not the transmission system is abnormal when receiving the diagnostic signal.

Advantageous Effects of Invention

According to the present invention, the diagnostic signal in addition to the physical quantity detection signal is outputted from the physical quantity detector to the controller via the transmission line, and the controller performs control process on the basis of the physical quantity detection signal and determines abnormality of the transmission system when receiving the diagnostic signal. Accordingly, it is possible to determine abnormality of the physical quantity detection signal and to accurately detect signal transmission abnormality of the transmission system, thereby improving reliability of the physical quantity detecting device.

DESCRIPTION OF EMBODIMENTS

Hereinafter, embodiments of the present invention will be described with reference to the accompanying drawings.

Figure 1:
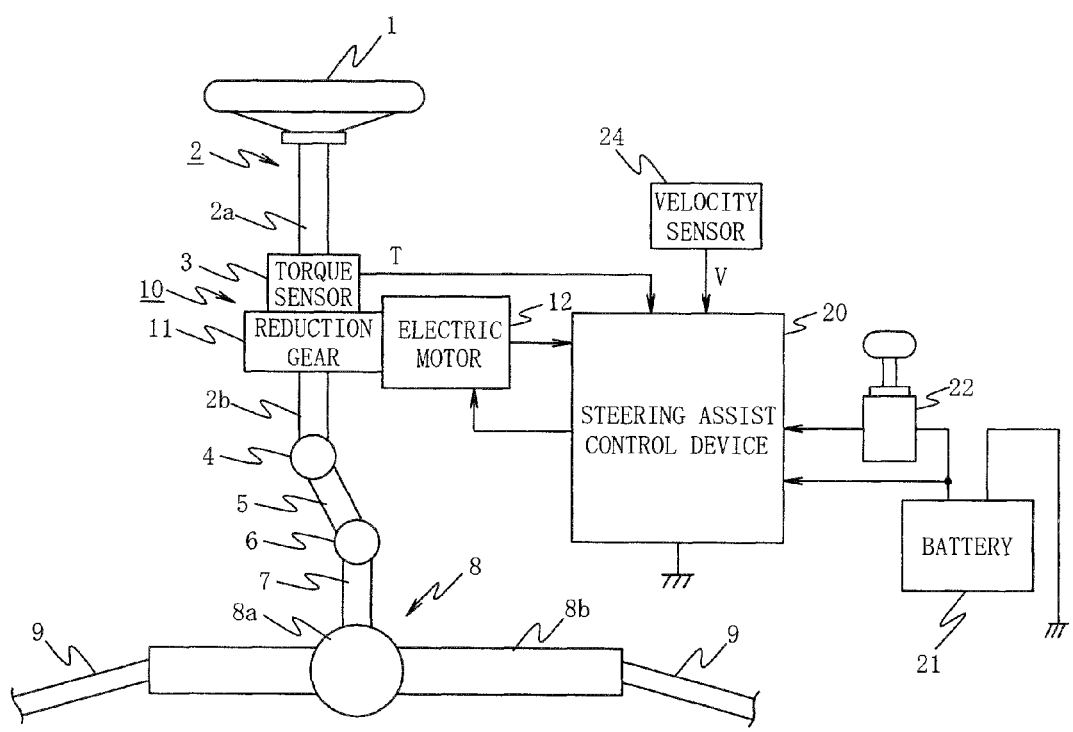
FIG. 1 is a diagram schematically illustrating a configuration of an electric power steering apparatus according to the present invention.

FIG. 1 is a diagram illustrating an example of the whole configuration of an electric power steering apparatus according to a first embodiment of the present invention.

In the electric power steering apparatus, a steering effort which is applied to a steering wheel 1 by a driver is transmitted to a steering shaft 2 including an input shaft 2a and an output shaft 2b. One end of the input shaft 2a of the steering shaft 2 is linked to the steering wheel 1 and the other end is linked to one end of the output shaft 2b via a torque sensor 3 as a detection unit of a physical quantity detecting device.

The steering effort transmitted to the output shaft 2b is transmitted to a lower shaft 5 via a universal joint 4 and is then transmitted to a pinion shaft 7 via a universal joint 6. The steering effort transmitted to the pinion shaft 7 is transmitted to tie rods 9 via a steering gear 8 to turn steered wheels not illustrated. Here, the steering gear 8 employs a rack-and-pinion type including a pinion 8a linked to the pinion shaft 7 and a rack 8b engaging with the pinion 8a, and converts a rotational motion transmitted to the pinion 8a into a linear motion by the use of the rack 8b.

A steering assist mechanism 10 that transmits a steering assist force to the output shaft 2b is linked to the output shaft 2b of the steering shaft 2. The steering assist mechanism 10 includes a deceleration mechanism 11 linked to the output shaft 2b and an electric motor 12 linked to the deceleration mechanism 11 to generate the steering assist force to be applied to the steering apparatus.

The torque sensor 3 is configured to detect the steering torque applied to the steering wheel 1 and transmitted to the input shaft 2a and includes, for example, a sensor unit 3a of a pulse width modulation (PWM) output type. The sensor unit 3a includes a torque sensor unit 3b, a calculating unit 3c, a signal output unit 3d, and a power supply circuit 3e.

The torque sensor unit 3b converts the steering torque into a torsion angle displacement of a torsion bar (not illustrated) interposed between the input shaft 2a and the output shaft 2b, converts the torsion angle displacement, for example, into a current variation, and outputs the current variation. For example, as disclosed in JP 2006-267045 A, the torque sensor unit 3b includes plural elongated protrusions that are formed on the outer circumferential surface of any one of the input shaft 2a and the output shaft 2b so as to extend in an extension direction, a cylindrical member that is fixed to the other of the input shaft 2a and the output shaft 2b so as to face the elongated protrusions and that has a rectangular window in the circumferential direction, at least two detection coils of which impedance varies in the opposite directions depending on a torque generated in a rotating shaft fixed to the outer circumference of the cylindrical member, a bridge circuit having resistors individually connected in series to the two detection coils so as to detect impedance variations of the detection coils, and an AC signal source that supplies an AC signal to the bridge circuit. The torque sensor unit amplifies a voltage across the detection coils of the bridge circuit, A/D converts the amplified voltage, and outputs the converted voltage as a digital voltage signal.

The calculating unit 3c receives the digital voltage signal outputted from the torque sensor unit 3b, performs a predetermined torque computing process on the basis of the received digital voltage signal to calculate a torque detection value, and generates a pulse-width modulated (PWM) signal St as a torque detection signal with a pulse width of a duty ratio in a predetermined effective range (for example, 5% to 95%) depending on the calculated torque detection value.

The calculating unit 3c generates a diagnostic signal Sd instead of the pulse-width modulated signal as the torque detection signal for a predetermined period of time after a supply of a power supply voltage from a power supply circuit 3e is started. The diagnostic signal Sd is set to have a duty ratio of 1% to 4% or a duty ratio of 96% to 99% which is out of the effective range of the pulse-width modulated signal as the torque detection signal, and is distinguishable from the pulse-width modulated signal St as the torque detection signal.

The calculating unit 3c includes a signal switching unit 3ca that switches between the pulse-width modulated signal St and the diagnostic signal Sd. The signal switching unit 3ca selects the diagnostic signal Sd for a predetermined period of time after the supply of the power supply voltage from the power supply circuit 3e is started, and selects the pulse-width modulated signal St after the predetermined period of time elapses.

Figure 3:
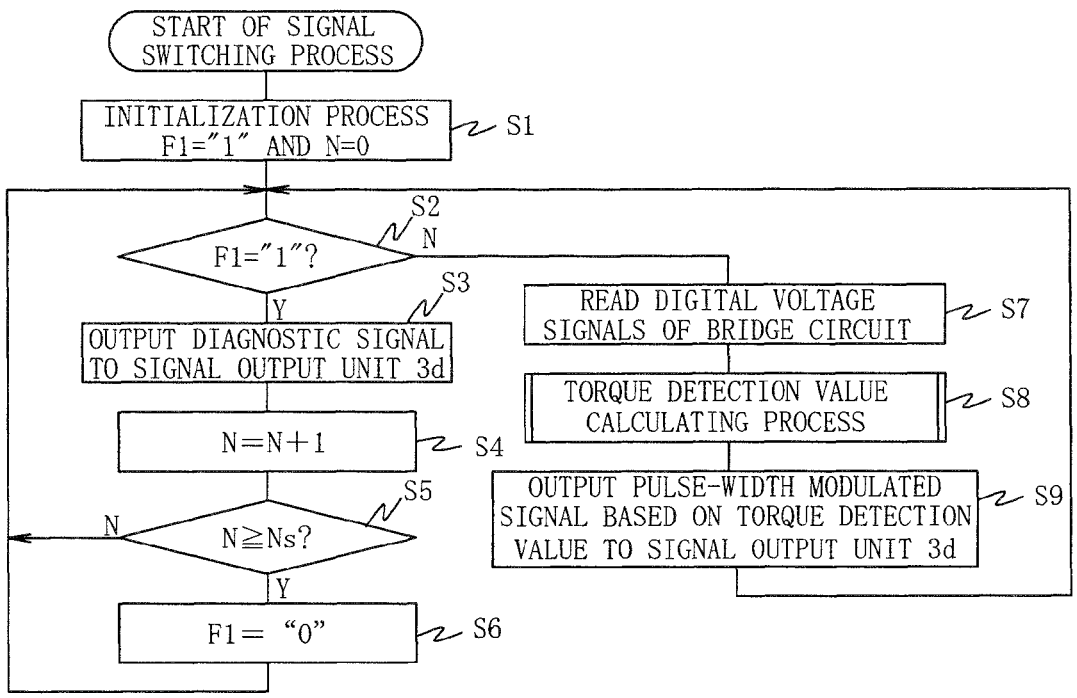
FIG. 3 is a flowchart illustrating an example of a signal switching procedure performed by a calculating unit of the torque sensor.

The calculating unit 3c performs a signal switching process illustrated in FIG. 3 when the supply of power is started. In the signal switching process, first, as the initialization process of step S1, a diagnostic period flag F1 is set to "1", the diagnostic period flag F1 indicating that a predetermined diagnostic period after the time of power-up does not elapse, and a variable N for counting the diagnostic period is cleared to "0".

Subsequently, it is determined in step S2 whether or not the diagnostic period flag F1 is set to "1". When it is determined that the diagnostic period flag F1 is set to "1", the diagnostic signal generated as a pulse-width modulated (PWM) signal which is set to have any of a duty ratio of 1% to 4% and a duty ratio of 96% to 99% which are out of the effective range of the above-mentioned pulse-width modulated (PWM) signal is outputted to the signal output unit 3d in step S3 and then the process goes to step S4.

In step S4, the variable N for counting the diagnostic period increases by "1" and it is determined in step S5 whether or not the variable N reaches a predetermined number Ns. When it is determined that "N<Ns", the process returns to step S2. When it is determined that "N≥Ns", the diagnostic period flag F1 is reset to "0" in step S6 and then the process returns to step S2.

On the other hand, when it is determined in step S2 that the diagnostic period flag F1 is "0", the digital voltage signal outputted from the torque sensor unit 3b is read in step S7 and then the process goes to step S8.

In step S8, a torque detection value calculating process is performed. In the torque detection value calculating process, a torque detection value is calculated by calculating difference signals of the read digital voltage signals, full-wave rectifying and averaging the difference signals, and adjusting a neutral voltage thereof.

Subsequently, in step S9, a duty ratio is calculated, for example, by referring to a duty ratio calculation map on the basis of the calculated torque detection value, the pulse-width modulated signal St with the calculated duty ratio is outputted to the signal output unit 3d, and then the process returns to step S2.

The signal switching process illustrated in FIG. 3 corresponds to the signal switching unit 3ca.

The signal output unit 3d outputs the pulse-width modulated signal outputted from the calculating unit 3c as the torque detection signal to the output terminal tso via a noise filter 3f.

The power supply circuit 3e converts a power supply voltage, which is supplied from the steering assist control device 20 as the control unit to be described later via a noise filter 3g, into a voltage used in the calculating unit 3c and the signal output unit 3d and outputs the converted voltage to the calculating unit 3c and the signal output unit 3d.

The torque detection signal T outputted from the torque sensor 3 is inputted to the steering assist control device 20.

The steering assist control device 20 operates with a supply of power from an in-vehicle battery 21 and controls driving of an electric motor 12 including, for example, a three-phase brushless motor applying a steering effort to the steering apparatus. The negative electrode of the battery 21 is grounded, and the positive electrode thereof is linked to the steering assist control device 20 via an ignition switch 22 for starting an engine and is also connected directly to the steering assist control device 20 without interposing the ignition switch 22.

Figure 2:
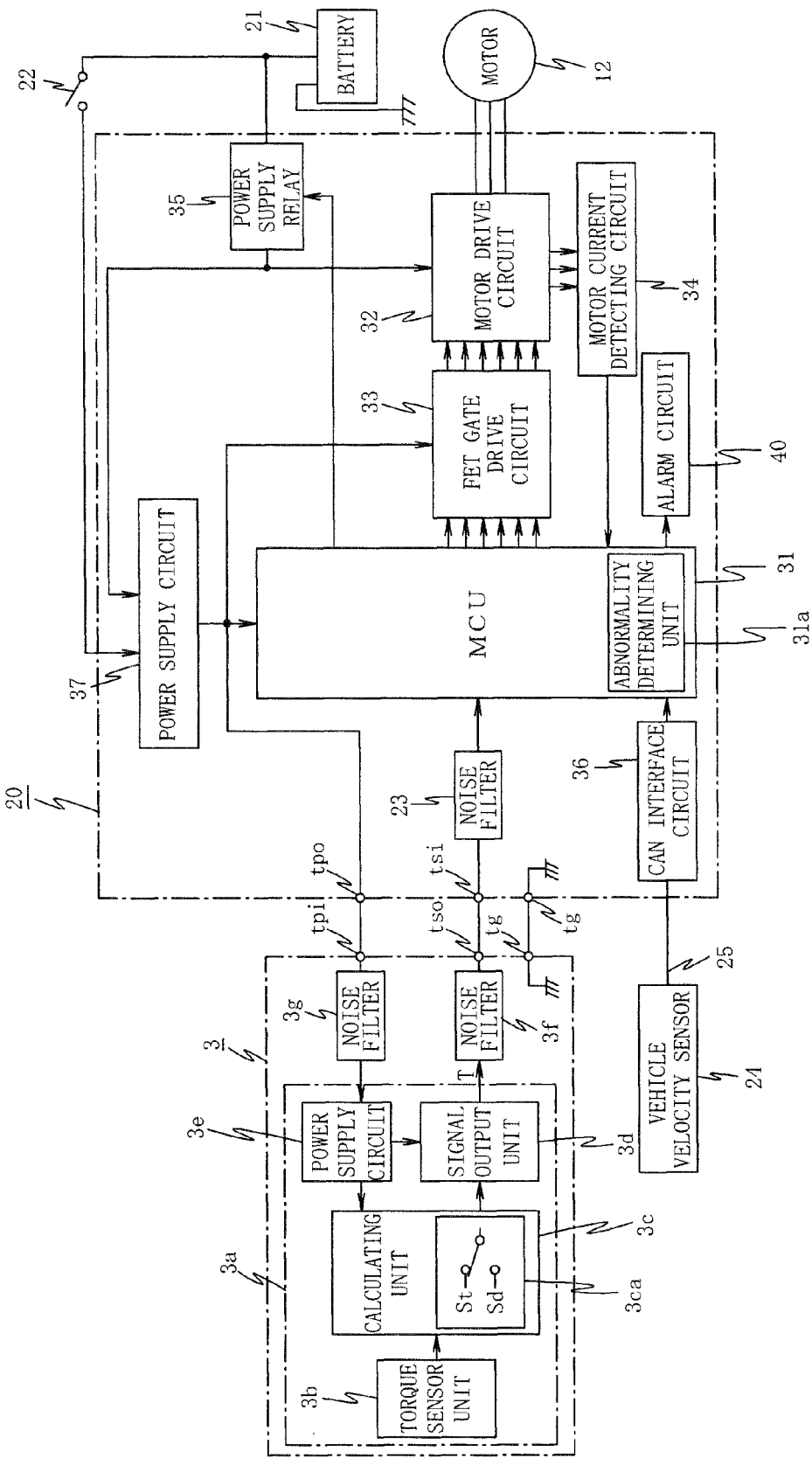
FIG. 2 is a block diagram illustrating configurations of a torque sensor and a controller according to an embodiment of the present invention.

As illustrated in FIG. 2, the steering assist control device 20 receives the torque detection signal T detected by the torque sensor 3 via a noise filter 23 and receives a vehicle velocity detection value Vs detected by the vehicle velocity sensor 24 via a vehicle controller area network (CAN) 25 which is a network connecting controllers in a vehicle.

The steering assist control device 20 includes a micro control unit (MCU) 31 as a control unit constituted of, for example, a microcomputer. The steering assist control device 20 includes a motor drive circuit 32, an FET gate drive circuit 33, and a motor current detecting circuit 34.

The micro control unit 31 calculates phase voltage command values for causing the electric motor 12 to generate the steering assist force on the basis of the detection signals of various sensors and generates a pulse-width modulated (PWM) control signal on the basis of the calculated phase voltage command values.

The motor drive circuit 32 includes field effect transistors (FET) that drive the electric motor 12.

The FET gate drive circuit 33 controls gate voltages of the field effect transistors of the motor drive circuit 32 on the basis of the PWM control signal outputted from the micro control unit 31.

The motor current detecting circuit 34 detects phase currents supplied for phases of the electric motor 12.

The motor current detecting circuit 34 detects motor currents of a U phase, a V phase, and a W phase from the voltages across motor current detection resistors inserted into the negative electrodes of a U-phase arm, a V-phase arm, and a W-phase arm of an inverter circuit constituting the motor drive circuit 32.

The steering assist control device 20 includes a power supply relay 35 that supplies power from the battery 21 to the motor drive circuit 32. The ON/OFF state of the power supply relay 35 is controlled by the micro control unit 31. The steering assist control device 20 includes a CAN interface circuit 36 that receives the vehicle velocity detection value Vs by performing an interface process with the vehicle CAN 25.

Furthermore, the steering assist control device 20 includes the power supply circuit 37 that is linked to the battery 21 via the ignition switch 22 and that is linked to the battery via the power supply relay 35. The power supply circuit 37 includes a regulator that lowers a battery voltage (for example, 12 V) to an internal voltage (for example, 5 V) necessary for the micro control unit 31 or the FET gate drive circuit 33.

The internal voltage outputted from the power supply circuit 37 is supplied as an internal power to the micro control unit 31, the FET gate drive circuit 33, the motor current detecting circuit 34, the CAN interface circuit 36, and the like, and is supplied to the torque sensor 3 via a power supply output terminal tpo.

Additionally, as illustrated in FIG. 2, the micro control unit 31 includes an abnormality determining unit 31a that determines abnormality of a signal transmission line to the torque sensor 3. The micro control unit 31 performs a steering assist control process illustrated in FIG. 4.

The steering assist control process is started when the ignition switch 22 is turned on and power is supplied to the micro control unit 31 from the power supply circuit 27.

That is, first, in step S11, an initialization process is performed to set the diagnostic state flag F2 to "1", to clear the variable N2 for counting the diagnostic signal reception number to "0", to set a timer to start counting of the diagnostic period, and to control the power supply relay 35 so as to be turned on.

Subsequently, in step S12, it is determined whether or not the diagnostic state flag F2 is set to "1". When it is determined that the diagnostic state flag F2 is set to "1", the process goes to step S13.

In step S13, it is determined whether or not the diagnostic signal with a predetermined duty ratio outputted from the calculating unit 3c of the above-mentioned torque sensor 3 is received. When it is determined that the diagnostic signal is received, the variable N2 indicating the diagnostic signal reception number increases by "1" in step S14 and then the process goes to step S15. When it is determined that the diagnostic signal is not received, the process immediately goes to step S15.

In step S15, it is determined whether or not the diagnostic period counted by the timer is up. When it is determined that the diagnostic period is not up, the process returns to step S12. When it is determined that the diagnostic period is up, it is determined in step S16 whether or not the variable N2 reaches a predetermined value N2s.

When it is determined in step S16 that "N2≥N2s", it is determined that the signal transmission line between the torque sensor 3 and the micro control unit 31 is normal, the diagnostic state flag F2 is reset to "0", and the process returns to step S12.

When it is determined that "N2<N2s", it is determined that the signal transmission line between the torque sensor 3 and the micro control unit 31 is abnormal and the process goes to step S18.

In step S18, a torque sensor abnormality alarm signal is outputted to an alarm circuit 40, a torque sensor abnormality alarm including sound, light, image information, or the like is issued from the alarm circuit 40, and then the steering assist control process is terminated. Here, when it is determined that the torque sensor is abnormal, a controlling value may be switched to a known alternative torque value and then the assist operation may be continued.

On the other hand, when it is determined in step S12 that the diagnostic state flag F2 is reset to "0", detection values of various sensors such as the torque sensor 3, the vehicle velocity sensor 24, and the motor current detecting circuit 34 are read in step S19. Then, in step S20, a steering assist current command value Iref is calculated by referring to a steering assist current command value calculation map indicating the relationship between the steering torque and the steering assist current command value using the vehicle velocity as a parameter on the basis of the steering torque T and the vehicle velocity detection value Vs and the process goes to step S21.

In step S21, a d-q axis current command value computing process is performed on the basis of the calculated steering assist current command value Iref to calculate a d-axis current command value Idref and a q-axis current command value Iqref. Then, in step S22, a two-phase to three-phase transformation process is performed to calculate three-phase motor current command values Iuref to Iwref.

Subsequently, current deviations ΔIu to ΔIw are calculated by subtracting the motor currents Iu to Iw from the motor current command values Iuref to Iwref in step S23, voltage command values Vuref to Vwref are calculated by performing a PI control process on the current deviations ΔIu to ΔIw in step S24, and then the process goes to step S25.

In step S25, the duty ratio is calculated on the basis of the calculated voltage command values Vuref to Vwref and a pulse width modulating process is performed to generate a gate control signal. Then, in step S26, the generated gate control signal is outputted to the FET gate drive circuit 33 and then the process returns to step S19.

Figure 4:
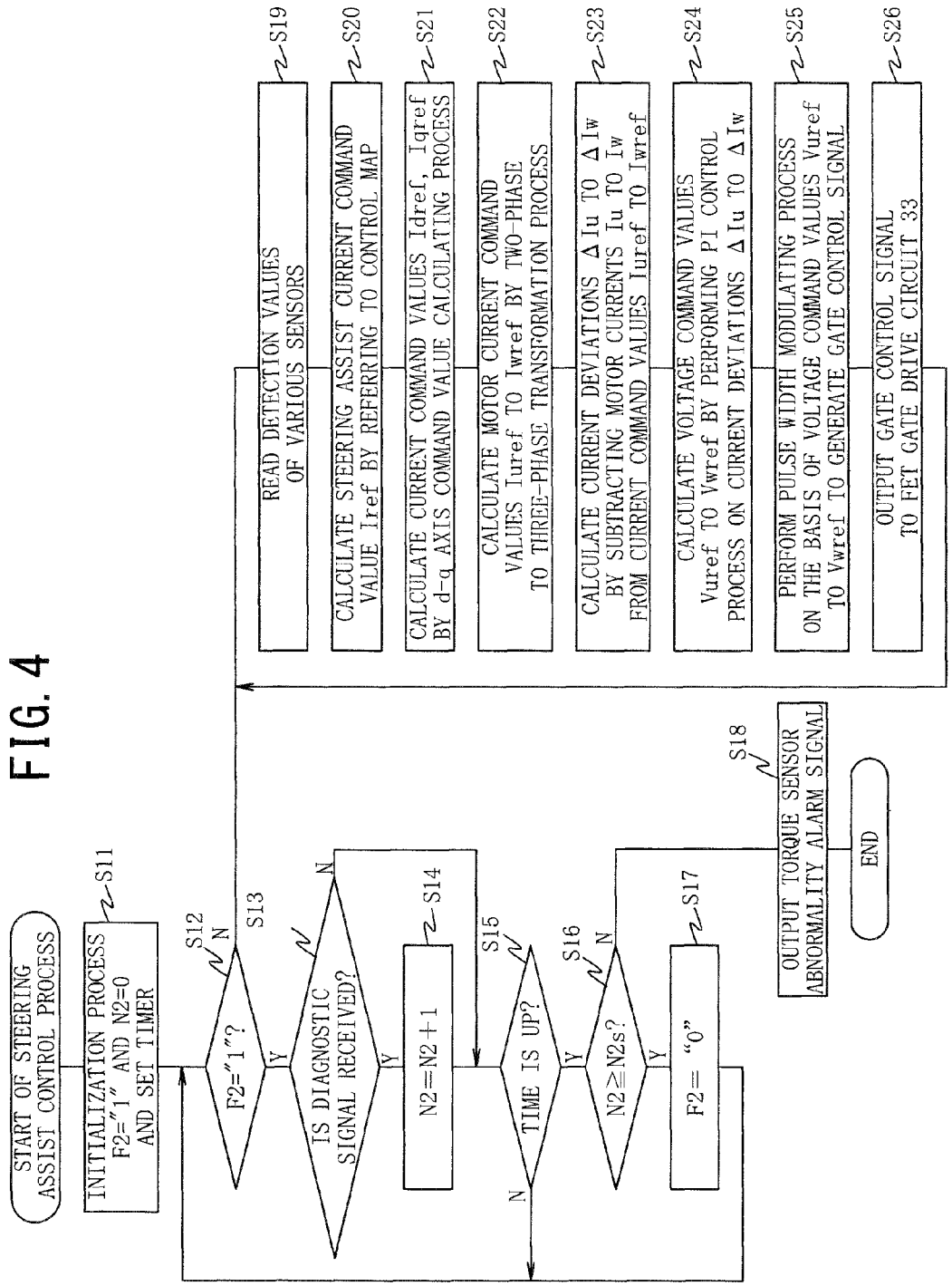
FIG. 4 is a flowchart illustrating an example of a steering assist control procedure performed by a micro control unit of a steering assist control device.

In the procedure illustrated in FIG. 4, the processes of steps S11 to S18 correspond to the abnormality determining unit 31a.

The power supply relay 35 is returned to the OFF state after various control processes of the micro control unit 31 are terminated.

Operations in the first embodiment will be described below.

When it is assumed that a vehicle stops, the ignition switch 22 is turned off, and the power supply relay 35 is in the OFF state, power from the battery 21 is not supplied to the power supply circuit 37 of the steering assist control device 20 in this state and thus the internal voltage is not outputted from the power supply circuit 37. Accordingly, the micro control unit 31, the motor drive circuit 32, the FET gate drive circuit 33, the motor current detecting circuit 34, and the alarm circuit 40 are in a deactivated state and the electric motor 12 is also in a non-rotating state.

Similarly, in the torque sensor 3, since the internal power is not supplied to the power supply circuit 3e from the power supply circuit 37 of the steering assist control device 20, the torque sensor unit 3b, the calculating unit 3c, and the signal output unit 3d are in a deactivated state.

When a driver starts an engine by turning on the ignition switch 22 in this state, power from the battery 21 is supplied to the power supply circuit 37 via the ignition switch 22. Accordingly, for example, the internal voltage of 5 V is supplied to the micro control unit 31, the FET gate drive circuit 33, the motor current detecting circuit 34, and the alarm circuit 40 from the power supply circuit 37 and these units are switched to an activated state.

At the same time, the internal voltage outputted from the power supply circuit 37 is supplied to the power supply circuit 3e of the torque sensor 3 via the power supply output terminal tpo, the power supply input terminal tpi, and the noise filter 3g. Accordingly, the internal voltage is outputted from the power supply circuit 3e to the torque sensor unit 3b, the calculating unit 3c, and the signal output unit 3d and these units are switched to an activated state.

At this time, the signal switching procedure described with reference to FIG. 3 is started by the calculating unit 3c of the torque sensor 3. First, the initialization process is performed to set the diagnostic period flag F1 to "1" and to clear the variable N for counting the diagnostic period to "0" (step S1).

Subsequently, since the diagnostic period flag F1 is set to "1", the process goes from step S2 to step S3 and the diagnostic signal with a predetermined duty ratio which is out of the effective range of the pulse-width modulated (PWM) signal indicating a normal steering torque detection value is outputted to the signal output unit 3d.

Thereafter, the variable N for counting the diagnostic period increases by "1" (step S4), it is then determined whether or not the diagnostic period variable N reaches a predetermined number Ns (step S5), and the output of the diagnostic signal is repeated until the diagnostic period variable N reaches the predetermined number.

On the other hand, in the steering assist control device 20, the steering assist control procedure illustrated in FIG. 4 is similarly started by the micro control unit 31. In the initialization process, the diagnostic state flag F2 is set to "1", the variable N2 indicating the diagnostic signal reception number is cleared to "0", and furthermore, the timer for setting the diagnostic period is set (step S11).

Subsequently, since the diagnostic state flag F2 is set to "1", the process goes from step S12 to step S13 and it is determined whether or not the diagnostic signal with a predetermined duty ratio is received from the torque sensor 3. At this time, when it is determined that the diagnostic signal is received, the variable N2 indicating the diagnostic signal reception number increases by "1" and then it is determined whether or not the diagnostic period counted by the timer is up. Since the timer is set just before, the process returns to step S12.

The process of counting the diagnostic signal reception number from steps S12 to S15 are repeatedly performed until the diagnostic period counted by the timer is up, that is, until the diagnostic period set by the calculating unit 3c of the torque sensor 3 elapses.

When the diagnostic period elapses, the diagnostic period flag F1 is reset to "0" in the torque computing process performed by the calculating unit 3c of the torque sensor 3 (step S6), the process goes from step S2 to step S7, and the torque detection value computing process is performed. In the torque detection value computing process, the torque detection value is calculated by reading the output voltages of the bridge circuit from the normal torque sensor unit 3b, full-wave rectifying and averaging the difference voltages of the output voltages, and adjusting the neutral voltage (step S8).

The duty ratio depending on the torque detection value is calculated by referring to the duty ratio calculation map on the basis of the calculated torque detection value, the pulse-width modulated (PWM) signal with the calculated duty ratio is outputted to the signal output unit 3d, and the pulse-width modulated (PWM) signal is outputted as the torque detection signal from the signal output unit 3d to the output terminal tso.

Similarly, the micro control unit 31 of the steering assist control device 20 repeatedly performs a diagnostic signal receiving process for the diagnostic period from the time of power-up and increases the variable N2 indicating the diagnostic signal reception number every time the diagnostic signal is received. Accordingly, when the signal transmission system between the sensor unit 3a of the torque sensor 3 and the micro control unit 31 of the steering assist control device 20 is not abnormal, the variable N2 indicating the diagnostic signal reception number becomes equal to or greater than a predetermined value N2s. Accordingly, when the diagnostic period counted by the timer is up, the process goes from step S15 to step S17 via step S16 and the diagnostic state flag F2 is reset to "0".

Therefore, when the process returns to step S12, the process goes from step S12 to step S19, the torque detection signal T, the vehicle velocity detection value Vs, the motor current detection value, and the like are read, and the steering assist current command value Iref is calculated by referring to the steering assist current command value calculation map on the basis of the read torque detection signal T and the read vehicle velocity detection value Vs (step S20).

The d-q axis command value computing process is performed on the basis of the calculated steering assist current command value Iref to calculate the d-axis current command value Idref and the q-axis current command value Iqref (step S22), and the calculated d-axis current command value Idref and the calculated q-axis current command value Iqref are processed by using a two-phase to three-phase transformation to calculate the three-phase motor current command values Iuref to Iwref (step S23).

Subsequently, the motor current detection values Iu to Iw are subtracted from the calculated motor current command values Iuref to Iwref, respectively, to calculate the current deviations ΔIu to ΔIw (step S23), the PI control process is performed on the calculated current deviations ΔIu to ΔIw to calculate the voltage command values Vuref to Vwref (step S24), the pulse width modulating process is performed on the basis of the calculated voltage command values Vuref to Vwref to generate the gate control signal (step S25), and the generated gate control signal is outputted to the FET gate drive circuit 33 (step S26).

Accordingly, the gate control signal is outputted from the FET gate drive circuit 33 to the motor drive circuit 32 and the three-phase motor currents Iu to Iw are outputted from the motor drive circuit 32 to the electric motor 12. Therefore, the electric motor 12 is driven to rotate so as to generate a steering assist torque depending on the steering torque detection value, and the generated steering assist torque is transmitted to the output shaft 2b of the steering shaft 2 via the deceleration mechanism 11. As a result, it is possible to steer the steering wheel 1 with a small steering effort.

On the other hand, when the variable N2 indicating the diagnostic signal reception number is less than a predetermined value N2s in the diagnosis process at the time of power-up, it is determined that abnormality occurs in the signal transmission system between the calculating unit 3c of the torque sensor 3 and the micro control unit 31 of the steering assist control device 20.

Accordingly, when the diagnostic period counted by the timer is up and the diagnostic period elapses, the process goes from step S16 to step S18, the torque sensor abnormality alarm signal is outputted to the alarm circuit 40, and then the steering assist control process is terminated. The alarm circuit 40 issues an alarm using sound, light, image information, or the like to notify a driver of the abnormality of the torque detection value transmission system. When it is determined that the torque sensor is abnormal, the controlling value may be switched to the known alternative torque value and then the assist operation may be continued.

As a result, it is possible to surely prevent the steering assist control process from being performed in a state where the steering torque detection signal read by the micro control unit 31 is abnormal.

In this way, according to the first embodiment, the calculating unit 3c of the torque sensor 3 generates and outputs the diagnostic signal to the micro control unit 31 as a control unit of the steering assist control device 20 at least at the time of starting the supply of power, and it is determined whether or not the micro control unit 31 normally receives the diagnostic signal. Accordingly, it is possible to accurately detect the abnormality of the signal transmission system including the noise filters 3$f$ and 14 between the calculating unit 3$c$ of the torque sensor 3 and the micro control unit 31, thereby improving reliability of the electric power steering apparatus.

In addition, since the diagnostic signal used to detect abnormality uses a duty ratio of 1% to 4% or a duty ratio of 96% to 99% out of the effective range (duty ratio of 5% to 95%) of the pulse-width modulated (PWM) signal in which a normal torque detection signal is outputted, it is possible to accurately determine whether or not the diagnostic signal is received at the time of the diagnostic process of the micro control unit 31.

Furthermore, even when the diagnostic signal is erroneously outputted from the calculating unit 3$c$ of the torque sensor 3 in the normal operation, the micro control unit 31 does not recognize the erroneous diagnostic signal as the torque detection signal and it is thus possible to avoid the possibility of occurrence of an erroneous operation.

Additionally, since the output computing process of a diagnostic signal and the reception computing process of a diagnostic signal are performed as the respective software processes, the present invention can be easily applied to an existing electric power steering apparatus not having a signal transmission system diagnosing function by only changing programs of the calculating unit 3$c$ of the torque sensor 3 and the micro control unit 31 of the steering assist control device 20.

In the first embodiment, the descriptions are given for a case where the diagnostic signal is outputted from the calculating unit 3$c$ of the torque sensor 3 at the time of power-up and the diagnostic signal is received by the micro control unit 31 of the steering assist control device 20, but the present invention is not limited to this case.

That is, the calculating unit 3$c$ of the torque sensor 3 may set the diagnostic period flag F1 to "1", perform the diagnostic signal output process (steps S2 to S6), and output the diagnostic signal for a predetermined period of time, at a fixed period of time T1 after the time of power-up.

Then, the micro control unit 31 of the steering assist control device 20 performs the diagnostic signal determining process (steps S12 to S18) for a predetermined period of time by setting the diagnostic state flag F2 to "1" and setting the timer, at a fixed period of time T1 equal to that in the calculating unit 3$c$ after the time of power-up.

In the diagnostic signal determining process, it may be determined whether or not abnormality occurs in the signal transmission system between the calculating unit 3$c$ of the torque sensor 3 and the micro control unit 31 of the steering assist control device 20 on the basis of the reception state of the diagnostic signal. In this case, the output period of the diagnostic signal is preferably set to a short period so as to reduce an influence on the steering assist control by the continuously-output torque detection signals.

A second embodiment of the present invention will be described below with reference to FIG. 5.

In the second embodiment, the steering assist control device 20 can request the torque sensor 3 to transmit a diagnostic signal.

Figure 5:
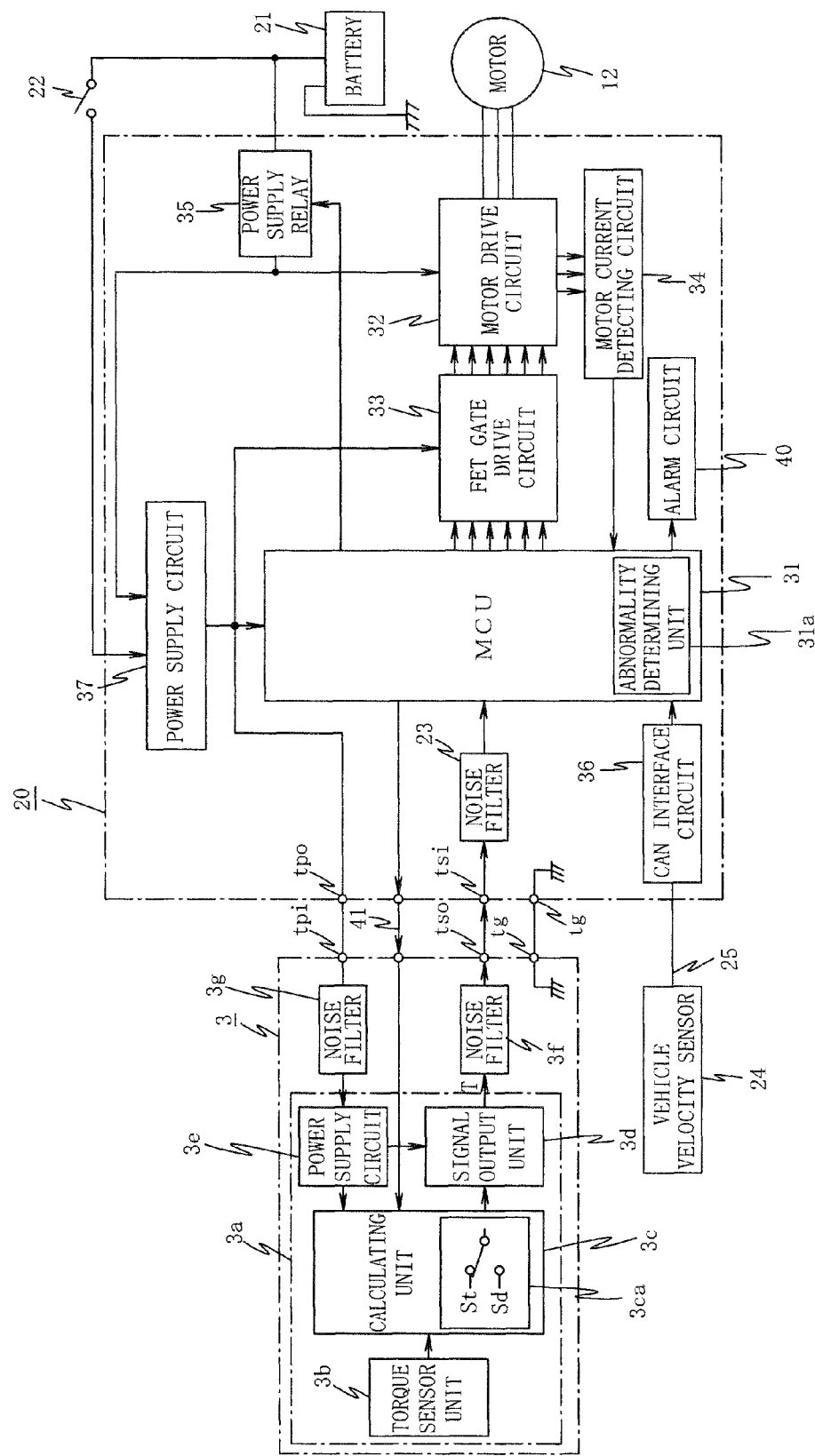
FIG. 5 is a block diagram illustrating configurations of a torque sensor and a controller according to a second embodiment of the present invention.

That is, in the second embodiment, a signal transmission line 41 for transmitting a diagnostic signal transmission request signal is provided between the micro control unit 31 of the steering assist control device 20 and the calculating unit 3$c$ of the torque sensor 3 as illustrated in FIG. 5.

Figure 6:
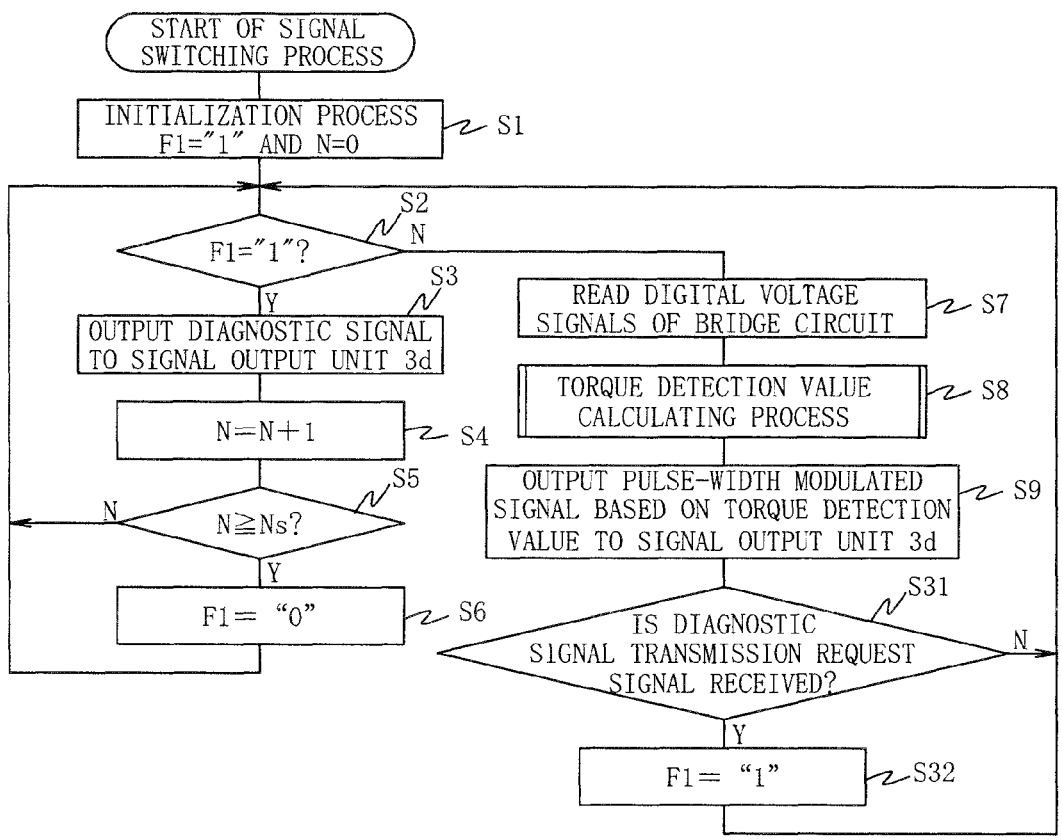
FIG. 6 is a flowchart illustrating an example of a signal switching procedure in the second embodiment.

In the signal switching process which is performed by the calculating unit 3$c$ of the torque sensor 3, step S31 is performed after step S9 as illustrated in FIG. 6. In step S31, it is determined whether or not the diagnostic signal transmission request signal is received from the micro control unit 31 of the steering assist control device 20 is performed.

When it is determined in step S31 that the diagnostic signal transmission request signal is not received, the process returns to step S2. When it is determined that the diagnostic signal transmission request signal is received, the diagnostic period flag F1 is set to "1" in step S32 and then the process returns to step S2.

Figure 7:
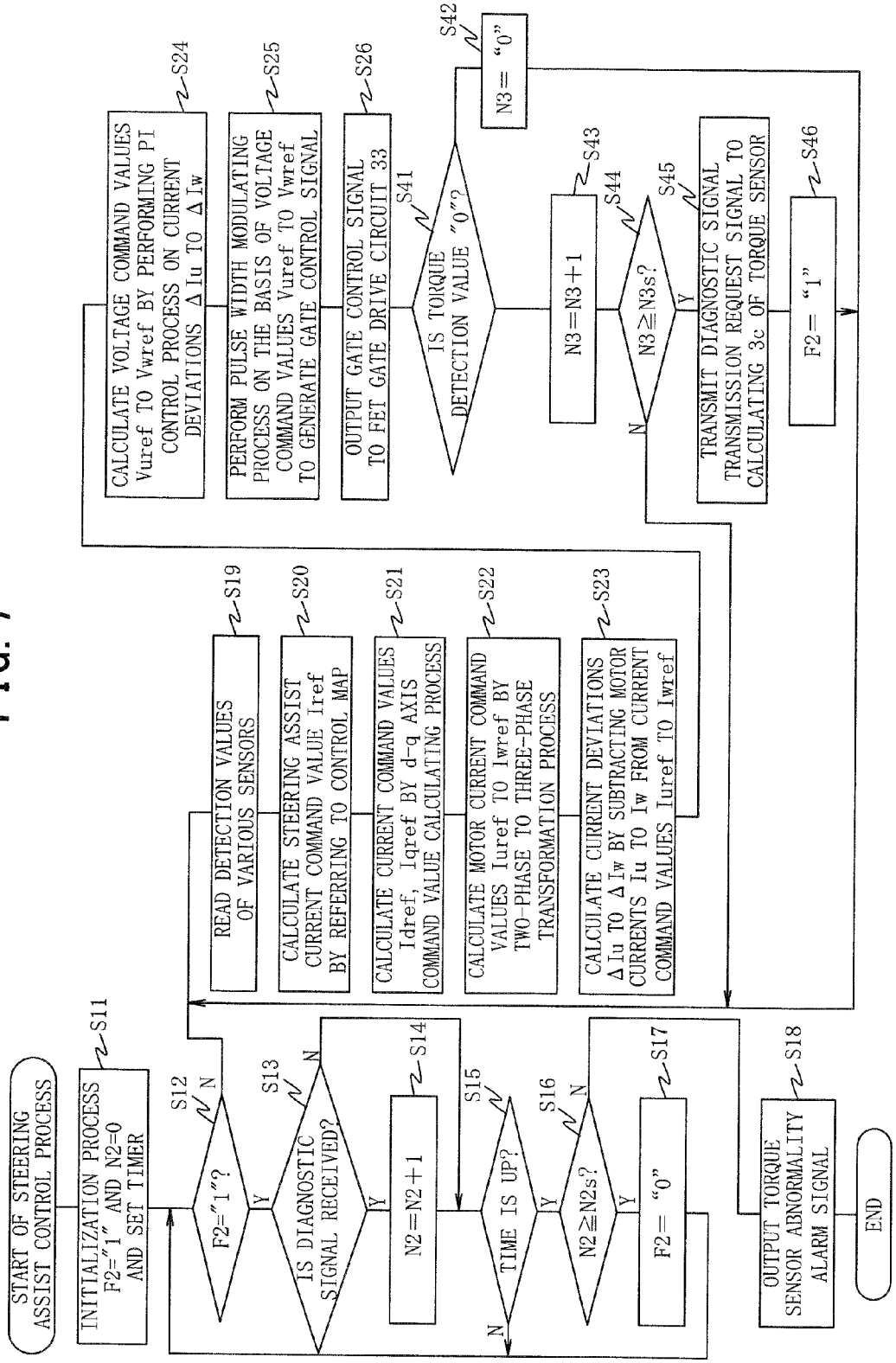
FIG. 7 is a flowchart illustrating an example of a steering assist control procedure in the second embodiment.

Furthermore, in the steering assist control process which is performed by the micro control unit 31 of the steering assist control device 20, step S41 is add after step S26 as illustrated in FIG. 7. In step S41, it is determined whether or not the steering torque detection value is "0" or a value within a dead zone in the vicinity of "0".

When it is determined in step S41 that the steering torque detection value is not "0" nor a value within a dead zone in the vicinity of "0", a variable N3 to be described later is cleared to "0" in step S42 and then the process returns to step S19. On the other hand, when it is determined that the steering torque detection value is "0" or a value within a dead zone in the vicinity of "0", it is determined that the steering is held at a neutral position, the variable N3 for counting the duration of the steering-held state increases by "1" in step S43, and then the process goes to step S44.

In step S44, it is determined whether or not the variable N3 reaches a predetermined value N3$s$. When it is determined that "N3<N3$s$", the process returns to step S19. When it is determined that "N3≥N3$s$", the diagnostic signal transmission request signal is transmitted to the signal transmission line 41 in step S45. Subsequently, in step S46, the diagnostic state flag F2 is set to "1", the timer is set, and then the process returns to step S12.

According to the second embodiment, similarly to the first embodiment, initial abnormality diagnostic process is performed at the time of power-up. In the abnormality diagnostic process, the abnormality of the signal transmission line between the calculating unit 3$c$ of the torque sensor 3 and the micro control unit 31 of the steering assist control device 20 is diagnosed. Furthermore, in the steering assist control process of the micro control unit 31 of the steering assist control device 20, when the state where the steering torque detection value is "0" or a value within a dead zone in the vicinity of "0" is maintained for a predetermined period of time, the micro control unit 31 transmits the diagnostic signal transmission request signal to the calculating unit 3$c$ of the torque sensor 3 so as to cause the calculating unit 3$c$ to transmit the diagnostic signal.

Accordingly, it is possible to diagnose the abnormality of the signal transmission system between the calculating unit 3$c$ of the torque sensor 3 and the micro control unit 31 of the steering assist control device 20 during operation of the steering assist control device 20 and also to diagnose the abnormality even after the time of power-up, thereby further improving reliability.

In the second embodiment, the descriptions are given for a case where the diagnostic signal transmission request signal is transmitted to the calculating unit 3$c$ of the torque sensor 3 via the signal transmission line 41 when the torque detection signal is "0" or a value within a dead zone in the vicinity of "0", but the present invention is not limited to this case.

That is, in the present invention, a steering angle sensor that detects a steering angle of the steering wheel 1 may be provided, and the diagnostic signal transmission request signal may be transmitted when a state where the steering angle is located at the neutral position (="0") indicating straight traveling is maintained for a predetermined period of time. In brief, the diagnostic signal transmission request signal may be transmitted during the period in which the transmitting does not affect on the steering assist control process. The diagnostic signal transmission request signal may be transmitted at a fixed period of time.

A third embodiment of the present invention will be described below with reference to FIGS. 8 and 9.

In the third embodiment, the abnormality of the noise filters 3f and 23 interposed between the torque sensor unit 3a of the torque sensor 3 and the micro control unit 31 of the steering assist control device 20 is detected.

That is, in the third embodiment, the abnormality determining unit 31a of the micro control unit 31 illustrated in FIG. 2 in the first embodiment is used to detect the abnormality of the noise filters 3f and 23.

Figure 8:
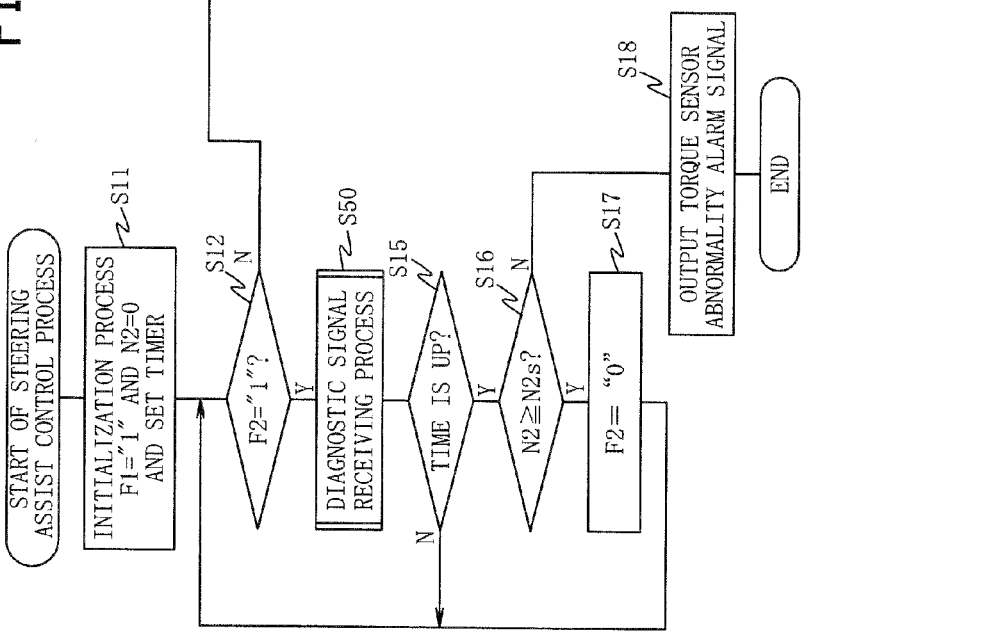
FIG. 8 is a flowchart illustrating an example of a steering assist control procedure in a third embodiment.

That is, the micro control unit 31 performs a steering assist control process illustrated in FIG. 8.

The steering assist control process includes step S50. In step S50, a diagnostic signal receiving process is performed instead of the processes of steps S13 and S14 in the steering assist control process illustrated in FIG. 4.

Figure 9:
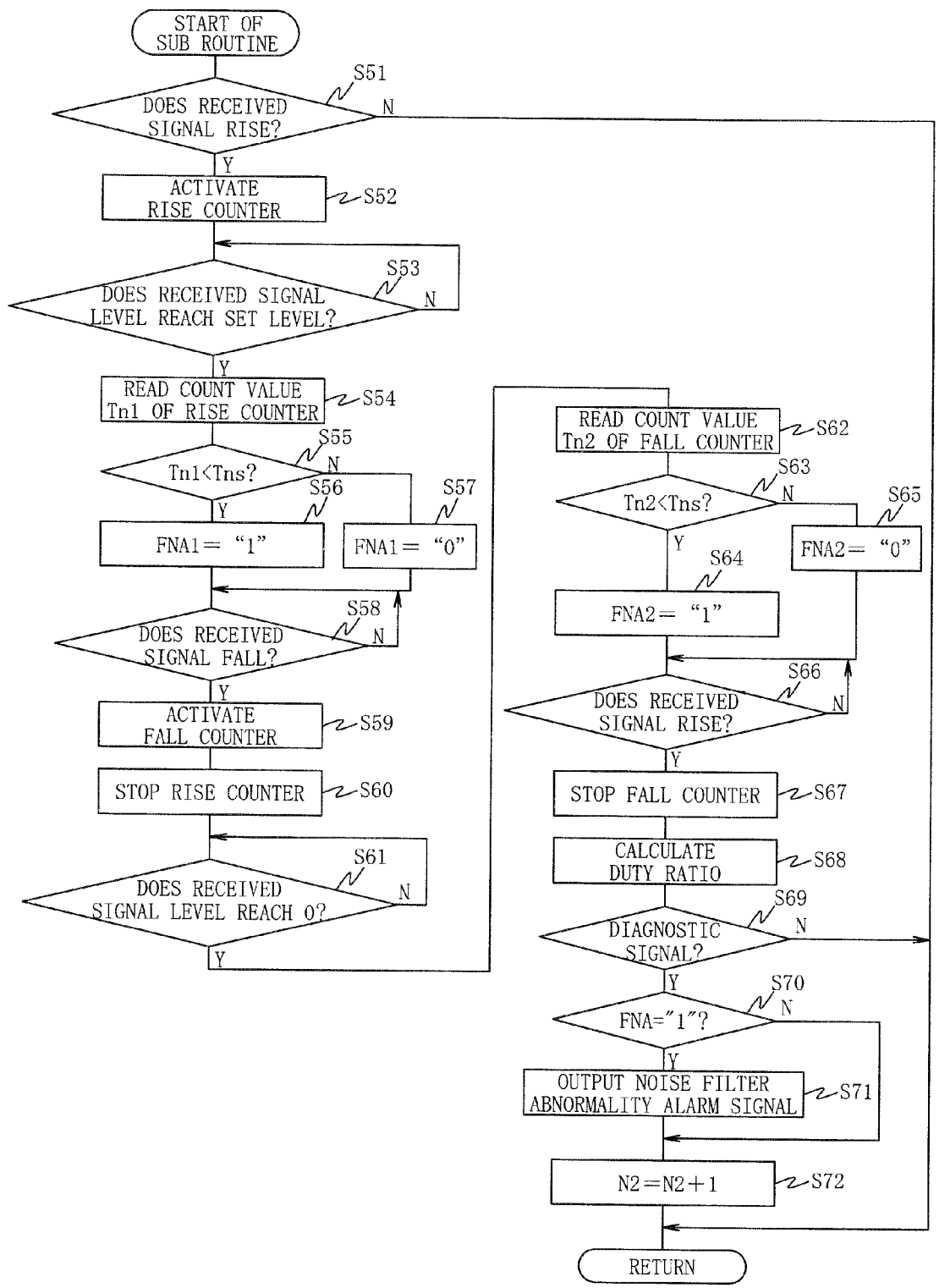
FIG. 9 is a flowchart illustrating a specific example of a diagnostic signal receiving process illustrated in FIG. 8.

In the diagnostic signal receiving process of step S50, as illustrated in FIG. 9, it is first determined in step S51 whether or not the received signal rises from 0 V. When it is determined that the received signal does not rise, the diagnostic signal receiving process is terminated without performing any process and then the process goes to step S15 illustrated in FIG. 8.

When it is determined in step S51 that the received signal rises, a rise counter including a software counter is activated to start a counting in step S52, so as to count at a constant a cycle shorter than the rise time of the received signal.

Subsequently, in step S53, it is determined whether or not the received signal level reaches a set level of, for example, 5 V which is the power supply voltage. When it is determined in step S53 that the received level does not reach the set level, the process waits until the received level reaches the set level. When it is determined that the received level reaches the set level, the process goes to step S54.

The count value Tn1 of the rise counter is read in step S54, and it is determined in step S55 whether or not the read count value Tn1 is smaller than a set count value Tns previously set to a value smaller than the count value in a state where both of the noise filters 3f and 23 are normal.

The determination of step S55 is to determine whether or not the rising of the received signal is rapid. That is, since the noise filters 3f and 23 are generally constituted of a low-pass filter and serve as an integration element, the received signal rises at a relatively slow change rate as indicated by a dotted line in FIG. 10 when the noise filters 3f and 23 are normal. However, when the noise filters 3f and 23 are abnormal and cannot serve as a filter, the integration elements do not operate and thus the received signal rides rapidly as indicated by a solid line in FIG. 10.

Therefore, by causing the rise counter to count the period of time in which the received signal rides from 0 V to the set level of 5 V, it is possible to determine whether or not the noise filters 3f and 23 are normal on the basis of the count value.

When it is determined that "Tn1<Tns", it is determined that abnormality occurs in any one of the noise filters 3f and 23, a filter abnormality flag FNA1 indicating that the noise filters 3f and 23 are abnormal is set to "1" in step S56, and then the process goes to step S58. When it is determined that "Tn1≥Tns", it is determined that the noise filters 3f and 23 are normal, the filter abnormality flag FNA1 is reset to "0" in step S57, and then the process goes to step S58.

In step S58, it is determined whether or not the received signal falls. When it is determined that the received signal does not fall, the process waits until the received signal falls. When it is determined that the received signal falls, the process goes to step S59.

A fall counter including a software counter is activated to start a counting in step S59 so as to count at a constant cycle shorter than the fall time of the received signal, the counting of the rise counter is stopped in step S60, and then the process goes to step S61. By stopping the counting of the rise counter at the time of falling of the received signal, the count value of the rise counter indicates the duration Ton of the ON section of the received signal.

In step S61, it is determined whether or not the received signal level reaches 0 V. When it is determined that the received signal level does not reach 0 V, the process waits until the received signal level reaches 0 V. When it is determined that the received signal level reaches 0 V, the process goes to step S62.

The count value Tn2 of the fall counter is read in step S62, and it is determined in step S63 whether or not the read count value Tn2 is smaller than a set count value Tns previously set to a value smaller than the count value in a state where both of the noise filters 3f and 23 are normal.

The determination of step S63 is to determine whether or not the fall of the received signal is rapid. That is, when the noise filters 3f and 23 are normal, the received signal falls at a relatively slow change rate as indicated by a dotted line in FIG. 10. However, when the noise filters 3f and 23 are abnormal and cannot serve as a filter, the integration elements do not operate and thus the received signal falls rapidly as indicated by a solid line in FIG. 10.

Therefore, by causing the fall counter to count the period of time in which the received signal falls from 5 V as the power supply voltage to 0 V, it is possible to determine whether or not the noise filters 3f and 23 are normal on the basis of the count value.

When it is determined that "Tn2<Tns", it is determined that abnormality occurs in any one of the noise filters 3f and 23, a filter abnormality flag FNA2 indicating that the noise filters 3f and 23 are abnormal is set to "1" in step S64, and then the process goes to step S66. When it is determined that "Tn2≥Tns", it is determined that the noise filters 3f and 23 are normal, the filter abnormality flag FNA2 is reset to "0" in step S65, and then the process goes to step S66.

In step S66, it is determined whether or not the received signal rises again. When it is determined that the received signal does not rise, the process waits until the received signal rises. When it is determined that the received signal rises, the process goes to step S67.

The counting of the fall counter is stopped in step S67 and then the process goes to step S68. The count value Tn2 of the fall counter indicates the duration Toff of the OFF section of the received signal.

In step S68, the duty ratio D of the received signal is calculated according to Expression (1) on the basis of the duration Ton of the ON section of the received signal indicated by the count value Tn1 of the stopped rise counter and the duration Toff of the OFF section of the received signal indicated by the count value Tn2 of the stopped fall counter, and then the process goes to step S69.

$$D = Ton/(Ton+Toff) \quad (1)$$

In step S69, it is determined whether or not the received signal is a diagnostic signal by determining whether or not the calculated duty ratio D corresponds to the set duty ratio of the diagnostic signal Sd. When it is determined that the received signal is not a diagnostic signal, the diagnostic signal receiving process is terminated and the process goes to step S15 of FIG. 8.

On the other hand, when it is determined in step S69 that the received signal is a diagnostic signal, it is determined in step S70 whether or not any one of the filter abnormality flags FNA1 and FNA2 is set to "1". When it is determined that any one of the filter abnormality flags FNA1 and FNA2 is set to "1", an alarm signal indicating abnormality of the noise filter is outputted to the alarm circuit 40 in step S71 and then the process goes to step S72. When it is determined that both of the filter abnormality flags FNA1 and FNA2 are reset to "0", the process immediately goes to step S72.

The variable N2 indicating the diagnostic signal reception number increases by "1" in step S72, the diagnostic signal receiving process is terminated, and then the process goes to step S15 of FIG. 8.

According to the third embodiment, in the diagnostic signal receiving process illustrated in FIG. 9 at the time of power-up, the rise time Tn1 of the received signal is measured in steps S51 to S54, and the fall time Tn2 of the received signal is measured in steps S58 to S62.

The rise time Tn1 and the fall time Tn2 indicate the change rates, that is, slopes, of the rise and the fall of the received signal. Therefore, when the noise filters 3f and 23 are normal and the received signal is received, as indicated by the dotted line in FIG. 10, the rise and the fall of the received signal are slow, the change rates thereof are small, the rise time Tn1 and the fall time Tn2 are longer than the set time Tns, and thus it can be determined that the noise filters 3f and 23 are normal.

Figure 10:
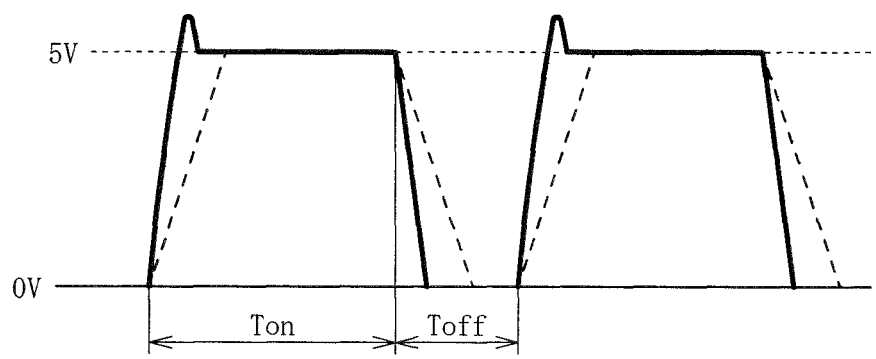
FIG. 10 is a waveform diagram illustrating a reception state of a diagnostic signal which is used to describe operations in the third embodiment.

However, for example, when both of the noise filters 3f and 23 are abnormal, the rise and the fall of the received diagnostic signal become rapider as indicated by the solid line in FIG. 10, the count value Tn1 of the rise counter read in step S54 is smaller than the set count value Tns, and the count value Tn2 of the fall counter read in step S62 is smaller than the set count value Tns.

Accordingly, the filter abnormality flag FNA1 is set to "1" in step S56, and the filter abnormality flag FNA2 is set to "1" in step S64.

Thereafter, when the received signal rises again, the process goes from step S66 to step S67, the fall counter is stopped, the duty ratio D is calculated according to Expression (1) on the basis of the count value Tn1, that is, the ON time Ton, of the stopped rise counter and the count value Tn2, that is, the OFF time Toff, of the stopped fall counter in step S68.

When the calculated duty ratio D is out of the effective range of the duty ratio of the pulse-width modulated signal St in which the torque detection signal is outputted, it can be determined that the received signal is the diagnostic signal. When it is determined that the received signal is the diagnostic signal, it is determined in step S70 whether or not the filter abnormality flag FNA1 or FNA2 is set to "1". When it is determined that any one of the filter abnormality flags FNA1 and FNA2 is set to "1", the alarm signal indicating the abnormality of the noise filter is outputted to the alarm circuit 40 to issue an alarm in step S71.

When both of the filter abnormality flags FNA1 and FNA2 are reset to "0", it is determined that the noise filters 3f and 23 are normal.

Figure 11:
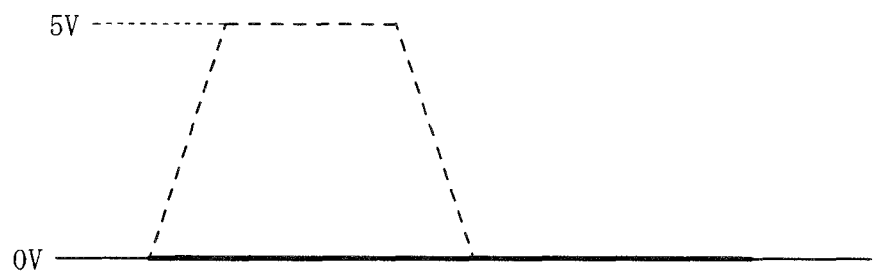
FIG. 11 is a waveform diagram illustrating a reception state of a received signal during disconnection.

On the other hand, when the received signal does not rise from 0 V as indicated by a solid line in FIG. 11, the diagnostic signal receiving process is terminated without performing any process after step S51. Accordingly, when the state where the received signal does not rise is maintained, the variable N2 indicating the diagnostic signal reception number is maintained in "0", and thus it can be determined that the transmission line between the torque sensor unit 3a and the micro control unit 31 of the steering assist control device 20 is in a disconnected state.

In the third embodiment, in order to determine whether or not the noise filters 3f and 23 are normal, the time until the received signal rises to the set voltage 5 V from 0 V as the rising state of the received signal is measured, and the time until the received signal reaches 0 V from the set voltage 5 V as the falling state of the received signal is measured. However, the present invention is not limited to the above-mentioned configuration. A voltage after a predetermined time elapses from the time point at which the rise or fall is detected may be detected to determine the rising state and the falling state of the received signal, or the period of time in which the received signal rises to a predetermined voltage and the period of time in which the received signal falls to a predetermined voltage may be measured. In brief, values corresponding to the change rates of the rise and the fall of the received signal have only to be detected. The present invention is not limited to the case where both the rising state and the falling state of the received signal are measured, but any one thereof may be measured.

In the third embodiment, the descriptions are given for a case where the process of determining abnormality of the noise filters is applied to the first embodiment, but the process of determining abnormality of the noise filters may be applied to the second embodiment.

In the first to third embodiments, the descriptions are given for a case where the torque detection value is outputted in the form of a pulse-width modulated (PWM) signal from the calculating unit 3c of the torque sensor 3, but the present invention is not limited to this case.

That is, the present invention may employ any signal transmitting method such as using an analog or digital voltage signal corresponding to the torque detection value or using a pulse signal with a pulse interval corresponding to the torque detection value.

In the first to third embodiments, the descriptions are given for a case where the abnormality of the signal transmission system is detected by causing the calculating unit 3c of the torque sensor 3 and the micro control unit 31 of the steering assist control device 20 to generate the diagnostic signal and to receive the generated diagnostic signal by a software process.

The present invention is not limited to the above-mentioned configuration, but the torque sensor 3 may be provided with a test signal forming circuit that outputs a test signal and a signal switching circuit that switches between the diagnostic signal of the test signal forming circuit and the torque detection signal calculated by the calculating unit 3c. Similarly, the calculating unit 3c and the micro control unit 31 may be constructed by hardware.

In the first to third embodiments, the descriptions are given for a case where only the steering torque is detected as the physical quantity, but the present invention is not limited to this case. When a steering angel sensor that detects a steering angle as the physical quantity is provided, the sensor unit 3a may be applied to the steering angle sensor. Alternatively, two or more types of physical quantities may be detected by physical quantity sensors and the detected physical quantities may be supplied to the steering assist control device in a time division manner. The physical quantities to be detected are not limited to the steering torque and the steering angle, but the present invention may be used to detect arbitrary physical quantities such as a current, a voltage, a pressure, and a liquid level.

In the above-mentioned embodiments, the descriptions are given for a case where the physical quantity detecting device according to the present invention is applied to the electric power steering apparatus, but the present invention is not limited to this case. The present invention may be applied to a physical quantity detecting device including a detection unit that detects a physical quantity and a control unit that performs a control operation on the basis of the physical quantity detected by the detection unit, or a control device that controls any control target using the physical quantity detecting device.

REFERENCE SIGNS LIST

1: steering wheel
2: steering shaft
3: torque sensor
3a: sensor unit
3b: torque sensor unit
3c: calculating unit
3d: signal output unit
3e: power supply circuit
3f, 3g: noise filter
10: steering assist mechanism
11: deceleration mechanism
12: electric motor
20: steering assist control device
21: battery
22: ignition switch
23: noise filter
24: vehicle velocity sensor
25: vehicle CAN
31: micro control unit (MCU)
31a: abnormality determining unit
32: motor drive circuit
33: FET gate drive circuit
34: motor current detecting circuit
35: power supply relay
36: CAN interface
37: power supply circuit
40: alarm circuit
41: signal transmission line

The invention claimed is:

1. A physical quantity detecting device comprising:
a physical quantity detector configured to detect a physical quantity and to output a physical quantity detection signal; and
a controller configured to receive the physical quantity detection signal outputted from the physical quantity detector via a transmission line and to perform a control operation on the basis of the physical quantity, wherein
the physical quantity detector outputs the physical quantity detection signal and a diagnostic signal for detecting abnormality of a transmission system between the controller and the physical quantity detector to the controller via a noise filter,
the controller includes an abnormality determining unit configured to determine the abnormality of the transmission system on the basis of the diagnostic signal when receiving the diagnostic signal, and
the abnormality determining unit determines whether or not the noise filter is abnormal by detecting a change of at least one of a rise and a fall of the received diagnostic signal.

2. The physical quantity detecting device according to claim 1, wherein the physical quantity detector outputs the diagnostic signal for a predetermined period of time at a fixed period of time.

3. The physical quantity detecting device according to claim 1, wherein the physical quantity detector outputs a signal distinguishable from the physical quantity detection signal as the diagnostic signal.

4. A physical quantity detecting device comprising:
a physical quantity detector configured to detect a physical quantity and to output a physical quantity detection signal; and
a controller configured to receive the physical quantity detection signal outputted from the physical quantity detector via a transmission line and to perform a control operation on the basis of the physical quantity, wherein
the physical quantity detector includes a signal switch configured to switch between the physical quantity detection signal and a diagnostic signal for detecting abnormality of a transmission system between the controller and the physical quantity detector and outputs the diagnostic signal at least at a time of power-up,
the controller includes an abnormality determining unit configured to determine the abnormality of the transmission system on the basis of the diagnostic signal when receiving the diagnostic signal,
the controller is configured to output a diagnostic signal output request to the physical quantity detector, and
the physical quantity detector outputs the diagnostic signal to the transmission line when receiving the diagnostic signal output request.

5. A physical quantity detecting device comprising:
a physical quantity detector configured to detect a physical quantity and to output a physical quantity detection signal; and
a controller configured to receive the physical quantity detection signal outputted from the physical quantity detector via a transmission line and to perform a control operation on the basis of the physical quantity, wherein
the physical quantity detector includes a signal switch configured to switch between the physical quantity detection signal and a diagnostic signal for detecting abnormality of a transmission system between the controller and the physical quantity detector and outputs the diagnostic signal at least at a time of power-up,
the controller includes an abnormality determining unit configured to determine the abnormality of the transmission system on the basis of the diagnostic signal when receiving the diagnostic signal,
the physical quantity detector outputs a pulse-width modulated signal with a pulse width corresponding to the physical quantity as the physical quantity detection signal, and
the diagnostic signal is set to have a duty ratio out of an effective range of the pulse-width modulated signal.

6. The electric power steering apparatus comprising the physical quantity detecting device according to claim 1, wherein the physical quantity detector outputs a pulse-width modulated signal with a pulse width corresponding to the physical quantity as the physical quantity detection signal, and wherein the diagnostic signal is set to have a duty ratio out of an effective range of the pulse-width modulated signal.

7. An electric power steering apparatus comprising the physical quantity detecting device according to claim 1, wherein the physical quantity detecting device detects at least one physical quantity necessary for calculating a steering torque command value and outputs the physical quantity detection signal and the diagnostic signal, and the controller calculates the steering torque command value on the basis of the physical quantity detection signal of the physical quantity detecting device, and controls an electric motor generating a steering assist force on the basis of the calculated steering torque command value, and the abnormality determining unit determines whether or not the transmission system is abnormal when receiving the diagnostic signal.

\* \* \* \* \*